No. 868,145.                                    PATENTED OCT. 15, 1907.
A. W. SWENDER.
DOG MUZZLE.
APPLICATION FILED FEB. 7, 1907.

WITNESSES:

Albert W. Swender,
INVENTOR.
By
ATTORNEYS

UNITED STATES PATENT OFFICE.

ALBERT W. SWENDER, OF CARROLL, IOWA.

DOG-MUZZLE.

No. 868,145.                    Specification of Letters Patent.                    Patented Oct. 15, 1907.

Application filed February 7, 1907. Serial No. 356,175.

*To all whom it may concern:*

Be it known that I, ALBERT W. SWENDER, a citizen of the United States, residing at Carroll, in the county of Carroll and State of Iowa, have invented a new and useful Dog-Muzzle, of which the following is a specification.

This invention has relation to muzzles and it consists in the novel construction and arrangement of its parts as hereinafter shown and described.

The object of the invention is to provide a muzzle especially adapted for dogs and which is of simple and substantial construction.

The muzzle consists primarily of wire ring adapted to pass around the throat of the animal and to which is attached a flexible band. Longitudinally disposed wires are attached at their ends to the said ring and extend longitudinally along the head of the animal, two of said wires passing along the top of the head and under the lower jaw while a third or side wire passes along the side of the head and across the nose. The side wire is interlocked with the wires that pass over the top of the head at a point in front of the nose. The said longitudinally disposed wires are braced by substantially parallel transversely disposed wires and sufficient space is left between the lower portions of the longitudinally disposed wires in order to permit the animal to reach small articles of food and also permit of its tongue hanging out while panting.

Figure 1:
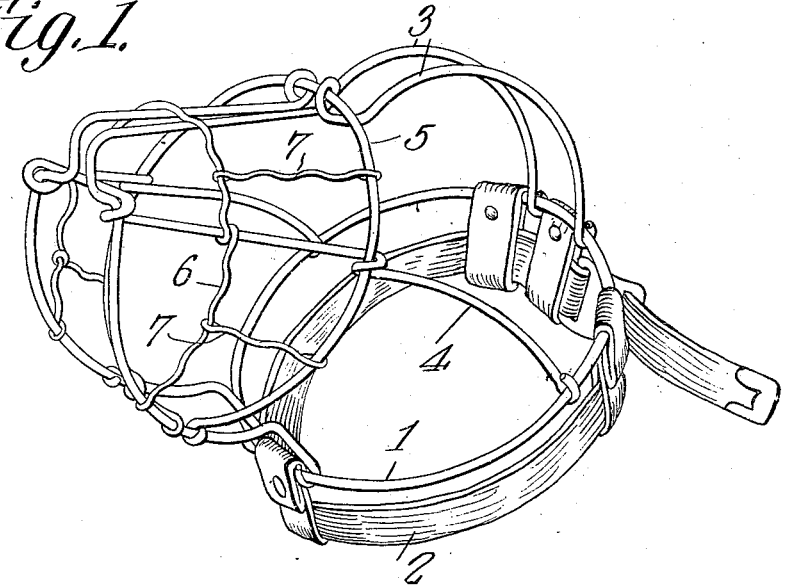
Figure 2:
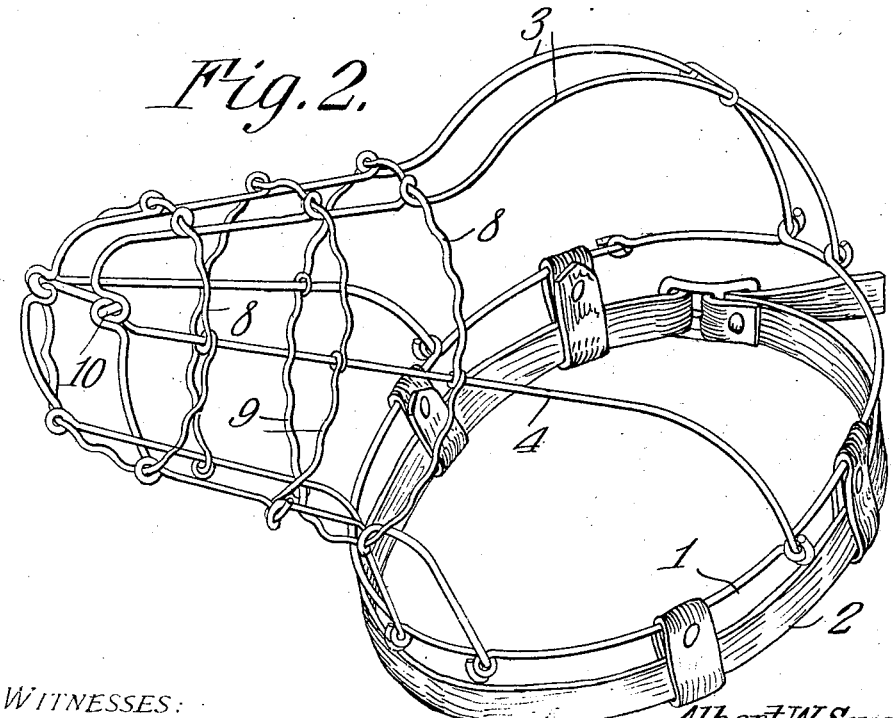

In the accompanying drawing:—Figure 1 is a perspective view of one form of the muzzle, and Fig. 2 is a perspective view of a modified form of the same.

The muzzle consists of the wire ring 1 which passes around the neck of the animal. The strap or band 2 is attached to the said ring 1 and forms a throat latch. The longitudinally disposed wires 3, 3 are attached at their end to the ring 1 and extend over the top of the head and down beyond the end of the nose and under or parallel with the lower jaw of the animal. The longitudinally disposed wire 4 is also attached at its ends to the ring 1 and is linked into engagement with the wires 3, 3 at a point in advance of the nose.

In the form of the invention as shown in Fig. 1 the transversely disposed wire 5 is secured at its end to the lower portion of the wires 3, 3 and also passes through loops provided upon the upper portion of the said wires 3, 3 and upon the wire 4. The wire 6 is also attached at its ends to the lower portion of the wires 3, 3 and passes up over the nose of the animal. The short longitudinally disposed wires 7 connect the wire 5 with the wire 6.

In the form of the invention as shown in Fig. 2 the transversely disposed wires 8 are continuous and at each point where they cross the wires 3, 3 and 4 are looped into engagement with the same. The intermediate wire 9 is not continuous and is secured at its ends to the lower portions of the wires 3 and is looped in engagement with the upper portions of the wires 3 and the wire 4.

In the form of the invention as shown in Fig. 2 each of the wires 3, 3 and 4 are provided with a loop at the points where the said wires intersect each other and the said loops are interlocked as at 10.

It will thus be observed that a muzzle of the character indicated is provided, the various parts of which are securely retained together at points of intersection and that at the same time the structure is light and does not interfere with the movement of the jaw of the animal in eating, drinking or breathing.

Having described my invention what I claim as new and desire to secure by Letters Patent is:—

1. A muzzle comprising a neck ring, longitudinally disposed wires secured at the ends to said ring, two of said wires extending over the top of the head and under the lower jaw while a third wire extends along the side of the head and across the nose, said wires being interlocked at their points of intersection and means for securing the muzzle.

2. A muzzle comprising a neck ring, longitudinally disposed wires connected at their ends to said ring, two of said wires extending over the top of the head and under the lower jaw and a third of said wires extending along the side of the head and across the nose, said wires being interlocked at their points of intersection, laterally disposed wires passing around and connecting with said longitudinally disposed wires and means for securing the muzzle.

3. A muzzle comprising a neck ring, longitudinally disposed wires secured at their ends to said ring, two of said wires passing over the top of the head and under the jaw and a third of said wires passing along the side of the head and across the nose, said wires being interlocked at their points of intersection, transversely disposed wires passing around the longitudinally disposed wires and being looped into engagement with the same, some of said transversely disposed wires being continuous while others terminate at the lower portions of the longitudinally disposed wires which pass under the jaw and means for securing the muzzle.

In testimony that I claim the foregoing as my own, I have hereto affixed my signature in the presence of two witnesses.

ALBERT W. SWENDER.

Witnesses:
J. J. MEYERS,
STACY DENAHY.